United States Patent Office 3,282,995
Patented Nov. 1, 1966

3,282,995
PROCESS FOR OXIDATION OF OLEFIN WITH A COPPER ARSENO-VANADATE CATALYST
Bernard Patrick Whim, Widnes, England, assignor to Imperial Chemical Industries Limited, London, England, a corporation of Great Britain
No Drawing. Filed May 15, 1963, Ser. No. 280,716
Claims priority, application Great Britain, May 25, 1962, 20,174/62
15 Claims. (Cl. 260—533)

This invention relates to a catalytic process for the manufacture of unsaturated aldehydes and/or unsaturated carboxylic acids from olefins and more particularly to a catalysed vapour-phase process whereby an alkenal and/or an alkenoic acid is made by interaction of an alk-1-ene and oxygen. The process is especially applicable to the production of methacrolein by interaction of isobutene and oxygen.

According to the present invention there is provided a process for the manufacture of an unsaturated aldehyde and/or an unsaturated carboxylic acid which comprises contacting a mixture of an olefin and oxygen at elevated temperature with a copper arseno-vanadate as catalyst.

In this process the catalyst specified produces a useful conversion of the olefin to the unsaturated aldehyde and/or unsaturated carboxylic acid without great loss of materials through complete oxidation of the olefin to carbon dioxide and water.

The precise structure of the catalyst is not clear, but it contains divalent copper in association with thermally stable oxygen acids of vanadium and arsenic. The copper arseno-vanadate catalyst may be made for example by mixing aqueous solutions of a copper salt, a vanadate, and arsenic pentoxide or an arsenate, and then evaporating the mixture to dryness and igniting it. It is preferred to use a copper salt, for example the nitrate, which is converted to the oxide by ignition in air or oxygen. Likewise, it is preferred that the arsenate or vanadate should be such that it can lose its cation on ignition; the ammonium salts are particularly useful in this respect. Ignition of the mixture is conveniently carried out at 300° C. to 500° C. in air.

It is preferred that the copper arseno-vanadate catalyst should contain a proportion of phosphoric acid in addition to the copper, vanadium and arsenic. The effect of this phosphoric acid is to reduce the loss of arsenic from the catalyst which can occur by volatilisation at elevated temperatures during ignition or use.

The proportion of copper, vanadium and arsenic in the catalyst (and phosphoric acid, if present) may be varied and selected by trial so as to achieve the optimum combination of physical and catalytic properties for the particular olefin and process conditions to be employed. It will be recognized that the catalyst components of copper, vanadium and arsenic, with or without phosphorous, are each in their higher valence states, for example, 2, 3, 5 and 5 respectively.

The catalyst may be in finely divided form or may be used as granules or pellets, and may if desired be deposited upon conventional supporting solids or mixed with inert solids. The mass of catalyst may be static in use, or may be employed using fluidised bed techniques.

The olefin may be a substantially pure material or a hydrocarbon fraction rich in the desired olefin, as may be obtained for example in petroleum cracking or refining processes. The process of the present invention is of especial interest when the olefin is isobutene, although useful results may also be obtained when the olefin is propene.

Pure oxygen may be used, but air or other gas mixtures containing free oxygen may also be used.

The mixture of olefin and oxygen may contain diluents. Such diluents may be for example nitrogen, steam, or other hydrocarbons. In particular, an alkane may be present; this may remain substantially unchanged or be oxidised during the process but does not interfere with the oxidation of the olefin.

The proportions of oxygen and olefin in the mixture to be contacted with the catalyst may be varied to suit the particular olefin and reaction temperature to be employed. In the case of isobutene, for example, very suitable mixtures are those containing between about 1 and 10 parts by volume of oxygen for each part by volume of isobutene.

The composition of the feed gas may be adjusted as desired so as to avoid inflammability or explosive properties.

Suitable temperatures at which the mixture of olefin and oxygen may be contacted with the catalyst are preferably those in the range between about 200° C. and 500° C. A catalyst containing phosphoric acid can usually be used over a more extended temperature range than a catalyst containing no phosphoric acid. In the process for the oxidation of isobutene to methacrolein, it is preferred to use a temperature of at least 280° C.

The mixture of olefin and oxygen may be passed over the catalyst in a reactor vessel provided with appropriate heating and/or cooling means to maintain the catalyst in the reaction zone at the desired temperature, while making due allowance for heat liberated during reaction. It is usually convenient to operate the process with the mixture of olefin and oxygen at substantially atmospheric pressure, any excess pressure above atmospheric pressure being for the purpose of promoting the flow of gas through the reactor and ancillary apparatus. Higher or lower pressures may be used if desired, however.

The rate of flow of the mixture of olefin and oxygen is usually such as to give a contact time between 0.5 and 10 seconds with the catalyst, but the contact time is preferably between 1 and 6 seconds, particularly in order to secure optimum conversion of isobutene to methacrolein.

The unsaturated aldehyde and/or unsaturated carboxylic acid (for example methacrolein and/or methacrylic acid) can be isolated from the gas emerging from the catalyst by conventional means, for example by condensation, scrubbing with water, fractional distillation and combinations of such techniques. Unreacted olefin remaining after extraction of the desired product can, if desired, be recycled to the gas mixture fed into the catalyst; the diluent can, if economically appropriate, be recycled also. Methacrolein so obtained can be used for conversion to methacrylic acid by further oxidation, and the methacrylic acid can be converted into esters. The methacrolein, methacrylic acid, methacrylic esters and corresponding compounds derived from other olefins can be used for the manufacture of a wide variety of polymers and copolymers of industrial value.

The invention is illustrated but not limited by the following examples in which the parts and percentages are by weight unless stated to be otherwise. The contact time in each example has been calculated on the basis of the gas volume at 25° C. and 760 mm. Hg.

*Example 1*

A copper arseno-vanadate catalyst was made by adding solutions of cupric nitrate (60.2 parts of the trihydrate in 200 parts of water) and arsenic pentoxide (86.2 parts in 200 parts of water) simultaneously to a solution of 60 parts of ammonium metavanadate in 1500 parts of water at 80° C. The mixture was evaporated to dryness and the solid residue was first dried at 110° C. and then calcined at 340° C. to 420° C. for 15 hours. The product contained copper, arsenic and vanadium in the atomic proportions 1:2.6:2. The catalyst was crushed and sieved to 36 B.S.S. mesh size and pelleted into 3/16 inch pellets before use.

A gas mixture consisting of (by volume) 2.1% isobutene and 97.9% air was made up, and then this was mixed with 15% of its volume of steam. The resulting mixture was then passed through the catalyst at 355° C. at a rate which gave a contact time of 3 seconds. Analysis of the effluent gases showed that 18% of the isobutene was consumed and 87% of the isobutene consumed was converted into methacrolein. When the same gas mixture was passed through the same catalyst at 428° C., at a rate which gave a contact time of 6 seconds, 84% of the isobutene was consumed, 23% of the isobutene consumed was converted to methacrolein and 3% of the isobutene consumed was converted to methacrylic acid.

*Example 2*

A copper arseno-vanadate catalyst was made by adding solutions of cupric nitrate (720 parts of the trihydrate in 1500 parts of water) and arsenic pentoxide (360 parts in 1500 parts of water) to a solution of 240 parts of ammonium metavanadate in 6000 parts of water at 80° C. The mixture was evaporated to dryness and the solid residue was first dried at 110° C. and then calcined at 350° C. for 15 hours. The product contained copper, arsenic and vanadium in the atomic proportions 3:3:2. The catalyst was crushed and sieved to 36 B.S.S. mesh size and pelleted into 3/16 inch pellets before use.

A gas mixture consisting of (by volume) 10% isobutene, 50% air and 40% nitrogen was passed through the calalyst at 349° C. at a rate which gave a contact time of 3 seconds. 45% of the isobutene was consumed and 63% of the isobutene consumed was converted to methacrolein.

*Example 3*

A copper phospho-arseno-vanadate catalyst was made by adding solutions of (a) cupric nitrate (121 parts of the trihydrate in 100 parts of water) and (b) arsenic pentoxide (57 parts in 100 parts of water) to (c) a solution prepared by suspending 120 parts of ammonium metavanadate in 1000 parts of water at 80° C. and adding sufficient 85% phosphoric acid to dissolve the vanadate completely. The mixture was evaporated to dryness and the solid residue was first dried at 110° C. and then calcined at 380° C. for 16 hours. The product contained copper, arsenic, vanadium and phosphorus in the atomic proportions 1:1:2:2. The catalyst was crushed and sieved to 36 mesh B.S.S. size and pelleted into 3/16 inch pellets before use. When a sample of this catalyst was heated at temperatures in the range 390° C. to 490° C. there was no noticeable loss of arsenic by volatilisation, whereas the catalysts described in Examples 1 and 2 did lose some arsenic by volatilisation as trioxide under the same conditions.

A gas mixture of (by volume) 2.7% isobutene and 97.3% air was made up, and then this was mixed with 10–15% of its volume of steam. The resulting mixture was then passed through the catalyst at 341° C. at a rate which gave a contact time of 6 seconds. 10% of the isobutene was consumed and 69% of the isobutene consumed was converted to methacrolein.

*Example 4*

Solutions of cupric nitrate, arsenic pentoxide and ammonium phosphovanadate were prepared and mixed as in Example 3. To 400 parts (by volume) of the mixed solution so prepared were added 100 parts (by weight) of titanium dioxide, 14–36 B.S.S. mesh. The mixture was stirred, allowed to stand for 16 hours at room temperature and then filtered. The separated catalyst was dried at 110° C. and calcined at 400° C. for 16 hours.

A gas mixture consisting of (by volume) 10% isobutene, 50% air and 40% nitrogen was passed through the catalyst at 387° C. at a rate which gave a contact time of 6 seconds. 36% of the isobutene was consumed and 51% of the isobutene consumed was converted to methacrolein.

*Example 5*

A catalyst was prepared in the same way as in Example 4, except that pumice (particle size 5–8 B.S.S. mesh) was used as the support.

A gas mixture consisting of (by volume) 2.2% isobutene and 97.8% air was passed through the catalyst at 448° C. with a contact time of 3 seconds. 10% of the isobutene was consumed and 57% of the isobutene consumed was converted to methacrolein. At 502° C., with a contact time of 3 seconds, 59% of the isobutene was consumed and 42% of the isobutene consumed was converted to methacrolein.

A gas mixture consisting of (by volume) 10% isobutene, 50% air and 40% nitrogen was passed through the same catalyst at 486° C. with a contact time of 6 seconds. 41% of the isobutene was consumed and 28% of the isobutene consumed was converted to methacrolein.

*Example 6*

A catalyst was prepared in the same way as in Example 4, except that bentonite (particle size 14–36 B.B.S. mesh) was used as the support.

A gas mixture consisting of (by volume) 2.2% isobutene and 97.8% air was passed through the catalyst at 431° C. with a contact time of 3 seconds. 66% of the isobutene was consumed and 24% of the isobutene consumed was converted to methacrolein.

*Example 7*

A catalyst was prepared in the same way as in Example 4, except that fused alumina (acid-washed, particle size 5–14 B.S.S. mesh) was used as the support.

A gas mixture consisting of (by volume) 1.8% isobutene, 88.1% air and 10.1% steam was passed through the catalyst at 428° C. with a contact time of 6 seconds. 86% of the isobutene was consumed and 42% of the isobutene consumed was converted to methacrolein.

A gas mixture of (by volume) 10% isobutene, 50% air and 40% nitrogen was passed through the catalyst at 498° C. with a contact time of 6 seconds. 44% of the isobutene was consumed and 63% of the isobutene consumed was converted to methacrolein.

*Example 8*

A catalyst was prepared in the same way as in Example 4, except that activated alumina (particle size 14–36 B.S.S. mesh) was used as the support.

A gas mixture consisting of (by volume) 10% isobutene, 50% air and 40% nitrogen was passed through the catalyst at 377° C. with a contact time of 6 seconds. 27% of the isobutene was consumed and 46% of the isobutene consumed was converted to methacrolein.

*Example 9*

A catalyst was prepared in the same way as in Example 4, except that a diatomaceous earth, Celite 22 (particle size 14–36 B.S.S. mesh) was used as the support.

A gas mixture consisting of (by volume) 1.8% isobutene, 80% air and 18.2% steam was passed through the catalyst at 381° C. with a contact time of 6 seconds. 22% of the isobutene was consumed and 60% of the isobutene consumed was converted to methacrolein. When the same gas mixture was passed through the same catalyst at 428° C., with a contact time of 6 seconds, 94% of the isobutene was consumed and 33% of the isobutene consumed was converted to methacrolein.

*Example 10*

A copper arseno-vanadate catalyst was made by adding solutions of cupric nitrate (60.2 parts of the trihydrate in 100 parts of water) and arsenic pentoxide (86.2 parts in 200 parts of water) to a solution of 60 parts of ammonium metavanadate in 1500 parts of water. The pH of the mixture was adjusted to pH 7 by addition of dilute ammonium hydroxide and the solution was evaporated to dryness. The residue was dried at 110° C. and calcined for 16 hours at 400° C. The product contained copper, arsenic and vanadium in the atomic proportions 1:3:2. The catalyst was crushed and sieved to 36 B.S.S. mesh size, pelleted into 3/16 inch pellets before use, and mixed with four times its own volume of Pyrex glass particles (8–12 B.S.S. mesh) before use.

A gas mixture consisting of (by volume) 0.7% isobutene, 83.3% air and 17.0% steam was passed through the mixture of catalyst and glass at 332° C. at a rate which gave a contact time of 2.5 seconds (calculated from the volume of the catalyst). 73% of the isobutene was consumed and 53% of the isobutene consumed was converted to methacrolein.

*Example 11*

A catalyst containing copper, arsenic and vanadium in the atomic proportions 2:3:2 was prepared by a method similar to that described in Example 1. The catalyst was pelleted into 3/16 inch pellets and mixed with four times its own volume of Pyrex glass particles (8–12 B.S.S. mesh) before use.

A gas mixture consisting of (by volume) 1.4% isobutene, 85.2% air and 13.4% steam was passed through the mixture of catalyst and glass at 384° C. at a rate which gave a contact time of 3 seconds (calculated from the volume of the catalyst). 88% of the isobutene was consumed and 50% of the isobutene consumed was converted to methacrolein.

When a gas mixture consisting of (by volume) 10% isobutene, 50% air and 40% nitrogen was passed through the same mixture of catalyst and glass at 377° C., with a contact time of 6 seconds, 54% of the isobutene was consumed and 56% of the isobutene consumed was converted to methacrolein.

*Example 12*

A catalyst prepared as described in Example 11 was sieved to 14–36 B.S.S. mesh size and mixed with four times its own volume of Pyrex glass particles (8–12 B.S.S. mesh) before use.

A gas mixture consisting of (by volume) 10% isobutene, 50% air and 40% nitrogen was passed through the mixture of catalyst and glass at 344° C., with a contact time of 6 seconds. 25% of the isobutene was consumed and 79% of the isobutene consumed was converted to methacrolein.

*Example 13*

A catalyst containing copper, arsenic and vanadium in the atomic proportions 1:3:3 was prepared by a method similar to that described in Example 1.

The catalyst was pelleted into 3/16 inch pellets and mixed with four times its own volume of Pyrex glass particles (8–12 B.S.S. mesh) before use.

A gas mixture consisting (by volume) 1.5% isobutene, 79.8% air and 18.7% steam was passed through the mixture of catalyst and glass at 319° C., at a rate which gave a contact time of 3 seconds (calculated from the volume of the catalyst). 23% of the isobutene was consumed and 72% of the isobutene consumed was converted to methacrolein.

*Example 14*

A catalyst containing copper, arsenic and vanadium in the atomic proportions 1:2:1 was prepared by a method similar to that described in Example 1. The catalyst was pelleted into 3/16 inch pellets and mixed with four times its own volume of Pyrex glass particles (8–12 B.S.S. mesh) before use.

A gas mixture consisting of (by volume) 1.1% isobutene, 86.6% air and 12.3% steam was passed through the mixture of catalyst and glass at 409° C., at a rate which gave a contact time of 3 seconds (calculated from the volume of the catalyst). 44% of the isobutene was consumed and 50% of the isobutene consumed was converted to methacrolein.

*Example 15*

A catalyst containing copper, arsenic and vanadium in the atomic proportions 1:2:2 was prepared by a method similar to that described in Example 1. The catalyst was pelleted into 3/16 inch pellets and mixed with four times its own volume of Pyrex glass particles (8–12 B.S.S. mesh) before use.

A gas mixture consisting of (by volume) 1.4% isobutene and 98.6% air was passed through the mixture of catalyst and glass at 349° C. at a rate which gave a contact time of 1 second (calculated from the volume of the catalyst). 46% of the isobutene was consumed and 40% of the isobutene consumed was converted to methacrolein.

*Example 16*

A copper phospho-arseno-vanadate catalyst was prepared as described in Example 3. The catalyst was crushed and graded to 14–36 B.S.S. mesh size and mixed with four times its own volume of Pyrex glass particles (8–12 B.S.S. mesh) before use.

A gas mixture consisting of (by volume) 10% propene, 49% air, and 41% steam was passed through the mixture of catalyst and glass at 419° C. at a rate which gave a contact time of 9.5 seconds (calculated from the volume of the catalyst). Analysis of the effluent gases showed that 50% of the propene fed was consumed and 32% of the propene consumed was converted to acrolein.

The same gas mixture was passed through the same mixture of catalyst and glass at 450° C., at a rate which gave a contact time of 2.5 seconds (calculated from the volume of the catalyst). 54% of the propene fed was consumed, 24% of the propene consumed was converted to acrolein and 2% of the propene consumed was converted to acrylic acid.

*Example 17*

A copper arseno-vanadate catalyst was prepared as described in Example 1. The catalyst was crushed and graded to 14–16 B.S.S. mesh size and mixed with four times its own volume of Pyrex glass particles (8–12 B.S.S. mesh) before use.

A gas mixture consisting of (by volume) 10% propene, 49% air and 41% steam was passed through the mixture of catalyst and glass at 360° C., at a rate which gave a contact time of 9.5 seconds (calculated from the volume of the catalyst). 50% of the propene was consumed, 5% of the propene consumed was converted to acrolein and 5% of the propene consumed was converted to acrylic acid.

The same gas mixture was passed through the same mixture of catalyst and glass at 386° C., at a rate which gave a contact time of 2.5 seconds (calculated from the volume of the catalyst). 31% of the propene was consumed and 17% of the propene consumed was converted to acrolein.

What is claimed is:

1. In a process for the manufacture of a compound selected from the group consisting of acrolein, acrylic acid, methacrolein and methacrylic acid by reacting oxygen and an olefin selected from the group consisting of propene and isobutene in the vapor phase at superatmospheric temperature and in the presence of a catalyst for said reaction, the improvement which comprises utilizing, as the catalyst, one consisting essentially of copper, arsenic, vanadium and oxygen, said copper, arsenic and vanadium are in their higher valence states.

2. The process of claim 1 wherein the catalyst is deposited on a support or mixed with an inert solid.

3. The process of claim 1 wherein the olefin is isobutene.

4. The process of claim 3 wherein the temperature is between 280° C. and 500° C.

5. The process of claim 1 wherein the olefin is propene.

6. The process of claim 5 wherein the propene is reacted with at least one part by volume of oxygen.

7. The process of claim 1 wherein the feed contains oxygen in the proportions of between 1 and 10 parts by volume of oxygen for each part by volume of isobutene.

8. The process of claim 1 wherein the reaction is carried out in the presence of an inert gaseous diluent.

9. The process as claimed in claim 8 wherein the inert gaseous diluent is one selected from the group consisting of nitrogen, steam, an alkane, and mixtures thereof.

10. The process of claim 1 wherein the reaction is carried out at a temperature between 200° C. and 500° C.

11. The process of claim 1 wherein the reaction is conducted at a temperature between 200° C. and 500° C. in the presence of an inert gaseous diluent selected from the group consisting of nitrogen, steam, an alkane and mixtures thereof; the catalyst contains from 0.67 to 2 gram atoms of vanadium and from 1 to 3 gram atoms of arsenic per gram atom of copper.

12. The process of claim 11 wherein the catalyst is deposited on a support.

13. In a process for the manufacture of a compound selected from the group consisting of acrolein, acrylic acid, methacrolein and methacrylic acid by reacting oxygen and an olefin selected from the group consisting of propene and isobutene in the vapor phase at superatmospheric temperature and in the presence of a catalyst for said reaction, the improvement which comprises utilizing, as the catalyst, one consisting essentially of copper, arsenic, vanadium, phosphorous and oxygen, the copper, arsenic, vanadium and phosphorous are in their higher valence states.

14. The process of claim 13 wherein the the reaction is conducted at a temperature between 200° C. and 500° C. in the presence of an inert gaseous diluent selected from the group consisting of nitrogen, steam, an alkane and mixtures thereof; the catalyst contains about 2 gram atoms of phosphorus, about 2 gram atoms of vanadium, and about 1 gram atom of arsenic per gram atom of copper.

15. The process of claim 14 wherein the catalyst is deposited on a support.

References Cited by the Examiner
UNITED STATES PATENTS

| | | | |
|---|---|---|---|
| 2,042,220 | 5/1936 | Groll et al. | 260—531 |
| 2,807,647 | 9/1957 | Cheney et al. | 260—604 |
| 3,031,508 | 4/1962 | Etherington et al. | 260—604 |

FOREIGN PATENTS

| | | |
|---|---|---|
| 828,821 | 2/1960 | Great Britain. |
| 903,034 | 8/1962 | Great Britain. |

R. K. JACKSON, *Primary Examiner.*

LEON ZITVER, LORRAINE A. WEINBERGER,
*Examiners.*

I. R. PELLMAN, S. B. WILLIAMS, *Assistant Examiners.*